United States Patent
Stiarwalt

(10) Patent No.: US 8,199,433 B2
(45) Date of Patent: Jun. 12, 2012

(54) USING AN RFID READER TO WRITE MESSAGES TO A TAPE CARTRIDGE MEMORY

(75) Inventor: Randolph E. Stiarwalt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 12/019,483

(22) Filed: Jan. 24, 2008

(65) Prior Publication Data

US 2009/0190259 A1    Jul. 30, 2009

(51) Int. Cl.
*G11B 23/02* (2006.01)
(52) U.S. Cl. ...... 360/132; 360/92.1; 235/375; 340/572.1
(58) Field of Classification Search ............... 360/92.1, 360/132; 340/572.1–572.8; 235/375
See application file for complete search history.

(56) References Cited

U.S. PATENT DOCUMENTS

| | | |
|---|---|---|
| 5,245,317 A | 9/1993 | Chidley et al. |
| 6,768,419 B2 | 7/2004 | Garber et al. |
| 7,123,146 B1 | 10/2006 | Holzman |
| 7,206,010 B2 | 4/2007 | Maghakian |
| 7,240,824 B2 | 7/2007 | Stockton |
| 7,628,332 B2 * | 12/2009 | Kaneko et al. ............... 235/491 |
| 2005/0010525 A1 | 1/2005 | Ross et al. |
| 2009/0146809 A1 * | 6/2009 | Kientz ...................... 340/572.1 |

FOREIGN PATENT DOCUMENTS

JP    2004-171243    *    6/2004    .................. 360/132

OTHER PUBLICATIONS

Translation from Examiner of Japanese Patent Application Publication No. JP2004171243 A filed Jun. 17, 2004 [provided by USPTO].

* cited by examiner

*Primary Examiner* — Allen Heinz
(74) *Attorney, Agent, or Firm* — David W. Victor; Konrad Raynes & Victor LLP

(57) ABSTRACT

A tape cartridge includes a housing and a length of magnetic tape disposed within the housing. Additionally, the tape cartridge includes at least one cartridge memory chip disposed within the housing and at least one RFID reader operably connected to at least one of the cartridge memory chips and configured to write at least one message to the cartridge memory chip based on a received RFID signal.

20 Claims, 3 Drawing Sheets

200

300

USING AN RFID READER TO WRITE MESSAGES TO A TAPE CARTRIDGE MEMORY

FIELD OF INVENTION

The present invention generally relates to tape storage devices. More specifically, the invention relates security of tape storage devices.

BACKGROUND OF THE INVENTION

Magnetic tape storage devices are a popular data storage device. In such devices, a cartridge includes magnetic tape that is wound and unwound between two wheels so that the tape contacts a read and write head when the cartridge is inserted in a magnetic tape storage device. Generally, a cartridge includes a single wheel upon which the magnetic tape is wound. On insertion into an appropriate tape drive, a door is opened, often using a cam or similar mechanical action, and an arm removes the tape leader from the cartridge.

As the volume of cartridges increases, and the size of libraries increases, cartridge memory ("CM") chips have been developed to incorporate certain information about the cartridge. CM chips are disposed within the cartridge and store information such as volume number, track listings, owner, last update, and other data potentially relevant to the information on the cartridge. When the cartridge is inserted in a tape drive, the tape drive accesses the information stored on the CM chip, and can access information and metadata about the data stored on the magnetic tape without actually mounting or reading the data on the tape, or simply access the information prior to mounting the tape.

While cartridges are a popular storage device, the security of the cartridges, and more importantly, the security of the data stored thereon can be problematic. Historically, tape cartridges are stored in secure areas, such as with access restrictions or the like. However, off site storage solutions reduce the efficacy of restricting access, and lost tapes are another difficulty. These difficulties are aggravated by the relatively small physical size of a cartridge, especially in comparison to the large volume of data stored on the magnetic tape.

It is therefore a challenge to develop strategies for storing tape cartridges to overcome these, and other, disadvantages.

SUMMARY OF THE INVENTION

One embodiment of the invention provides a tape cartridge that includes a housing and a length of magnetic tape disposed within the housing. The cartridge further includes at least one cartridge memory chip disposed within the housing and at least one RFID reader operably connected to at least one of the cartridge memory chips and configured to write at least one message to the cartridge memory chip based on a received RFID signal.

Another embodiment of the present invention is a tape cartridge security system that includes a housing and a length of magnetic tape disposed within the housing. The system further includes at least one cartridge memory chip disposed within the housing and at least one RFID reader operably connected to at least one of the cartridge memory chips and configured to write at least one message to the cartridge memory chip based on a received RFID signal. Furthermore, the system includes a RFID transmitter configured to transmit a RFID signal to the cartridge memory chip.

Yet another embodiment of the invention provides a tape cartridge security system that includes a housing and a length of magnetic tape disposed within the housing. The system further includes at least one cartridge memory chip disposed within the housing and at least one RFID reader operably connected to at least one of the cartridge memory chips and means for writing at least one message to the cartridge memory chip based on a received RFID signal.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
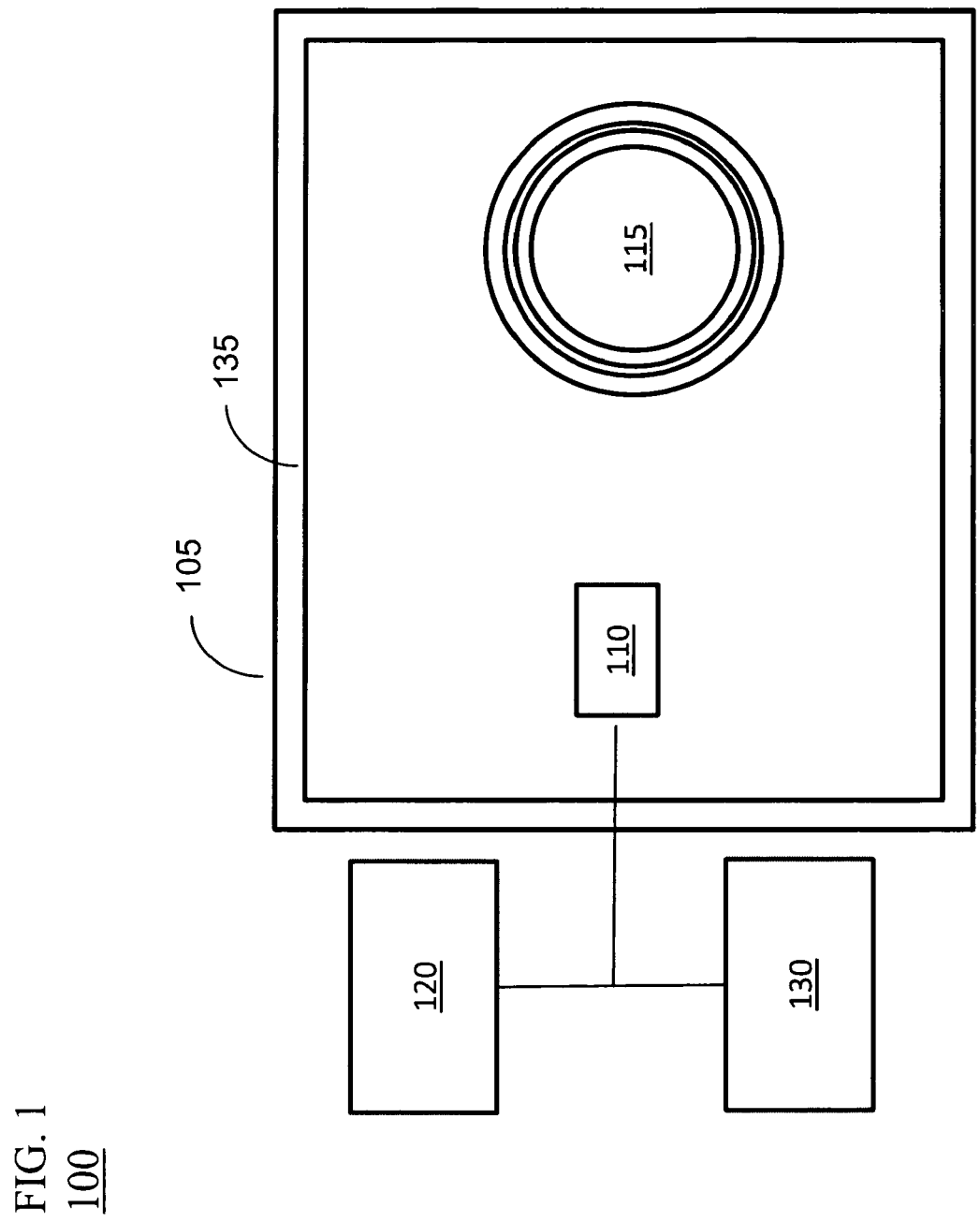
FIG. 1 illustrates one embodiment of a tape cartridge in accordance with one aspect of the invention.
Figure 2:
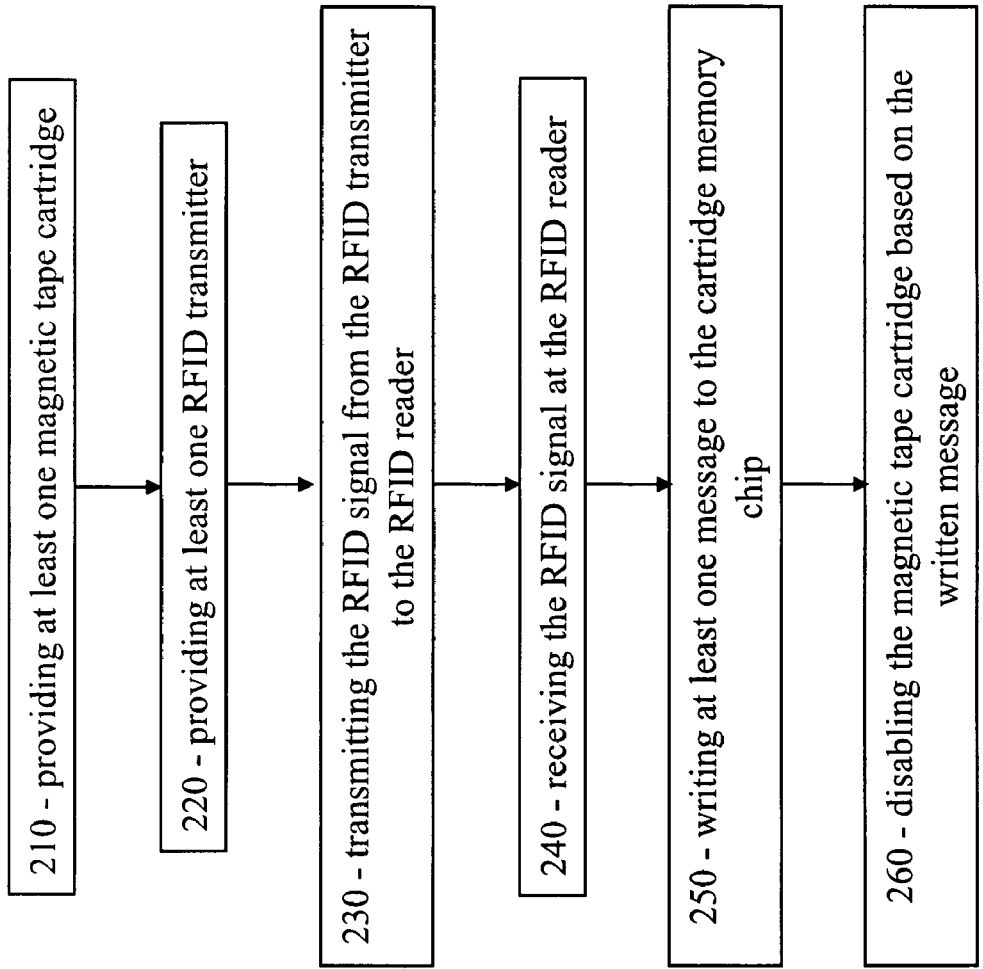
FIG. 2 illustrates one embodiment of a method for providing security for a tape cartridge in accordance with another aspect of the invention.

FIG. 1 illustrates one embodiment of a tape cartridge 100 in accordance with one aspect of the invention. Tape cartridge 100 includes a housing 105 and a length of magnetic tape 115 disposed within the housing. At least one cartridge memory ("CM") chip 110 is in communication with at least one RFID reader 120. The CM chip 110 and RFID reader 120 are operably connected and configured to write at least one message to the CM chip 110 based on a received RFID signal. The CM chip 110 is in communication with a device configured to read and/or write data to the CM chip. When the cartridge passes through a predetermined RFID signal, the RFID reader receives the signal, and instructs the device to write a predetermined message to the CM chip 110. In one embodiment, the message prevents the length of magnetic tape from removal from the cartridge. Such a message could be desired upon removing the cartridge from a secure storage location so that after removal, the magnetic tape is inaccessible and cannot be read. In another embodiment, the message prevents the length of magnetic tape from being mounted by a tape drive. In yet another embodiment, the message reauthorizes removal of the magnetic tape from the cartridge. Such a message could be desired after the cartridge is replaced in a secure storage area, after the cartridge had been disabled.

In one embodiment, a tape drive includes instructions to read at least one message from the CM chip prior to removing the magnetic tape from the cartridge. In such an embodiment, the tape drive will not remove the magnetic tape from the cartridge unless the message either allows the removal, or the message is not inconsistent with a standard message. Thus, for example, the tape drive can refuse to remove the tape from the cartridge unless certain messages, or combinations of messages, are written on the CM chip. The tape drive can default to either allowing removal of the cartridge or preventing removal of the cartridge depending on system design. In other embodiments, the message is written as a combination of a plurality of messages, rather than as a single message.

In one embodiment, housing 105 includes a door 135 configured to alternate between an open position allowing access to the length of magnetic tape and a closed position preventing removal of the length of magnetic tape and at least one pin configured to lock the door in the closed position based on the at least one message. The pin is controlled by an actuator controlled by instructions written on the CM chip, for example.

In one embodiment, the CM chip 110 is further in communication with at least one audible alarm device 130 configured to sound based on the message. In such an embodiment, the audible alarm device issues a sound when a RFID signal is received by the RFID reader 120 that includes an instruction to issue the sound. In one such embodiment, the CM chip 110 issues an audible alarm and writes a message when the cartridge passes through the RFID field.

Another aspect of the invention provides a tape cartridge security that includes a tape cartridge 100 as well as at least one RFID transmitter configured to transmit a RFID signal to the cartridge memory chip. The transmitter may be disposed within a floor of a storage facility, within a wall of the storage facility, or in the ceiling, as appropriate. Alternatively, the RFID transmitter may be more visibly deployed in a visible structure, such as a pair of loops anchored to the floor so that egress from a room requires passage between the pair of loops.

Using these devices, the tape cartridge can be securely stored at a facility and transported to an off-site storage facility with decreased opportunities for unauthorized data access. After leaving the facility, the tape cartridge will not load into a tape drive so that the data stored on the magnetic tape attains a higher level of security.

Therefore, in accordance with another aspect of the invention, a method 200 for providing security for a magnetic tape cartridge includes providing 210 at least one magnetic tape cartridge. The tape cartridge is implemented as tape cartridge 100 and includes a housing, a length of magnetic tape disposed within the housing, at least one cartridge memory chip disposed within the housing, and at least one RFID reader operably connected to at least one of the cartridge memory chips and configured to write at least one message to the cartridge memory chip based on a received RFID signal. The operable connection can include a radio frequency connection in one embodiment. In other embodiments, the connection includes a direct physical connection.

Method 200 further includes providing 220 at least one RFID transmitter configured to transmit a RFID signal to the cartridge memory chip and transmitting 230 the RFID signal from the RFID transmitter to the RFID reader. At step 240, the RFID signal is received at the RFID reader. Based on the received RFID signal, the cartridge memory chip writes at least one message at step 250. The message can de-authorize data access, re-authorize data access, provide for data access limitations restricting access to only certain portions of the magnetic tape, or the like. Based on the written message, method 200 disables 260 the magnetic tape cartridge based on the written message. In one embodiment, method 200 further enables the magnetic tape cartridge based on receiving a second RFID signal.

Figure 3:
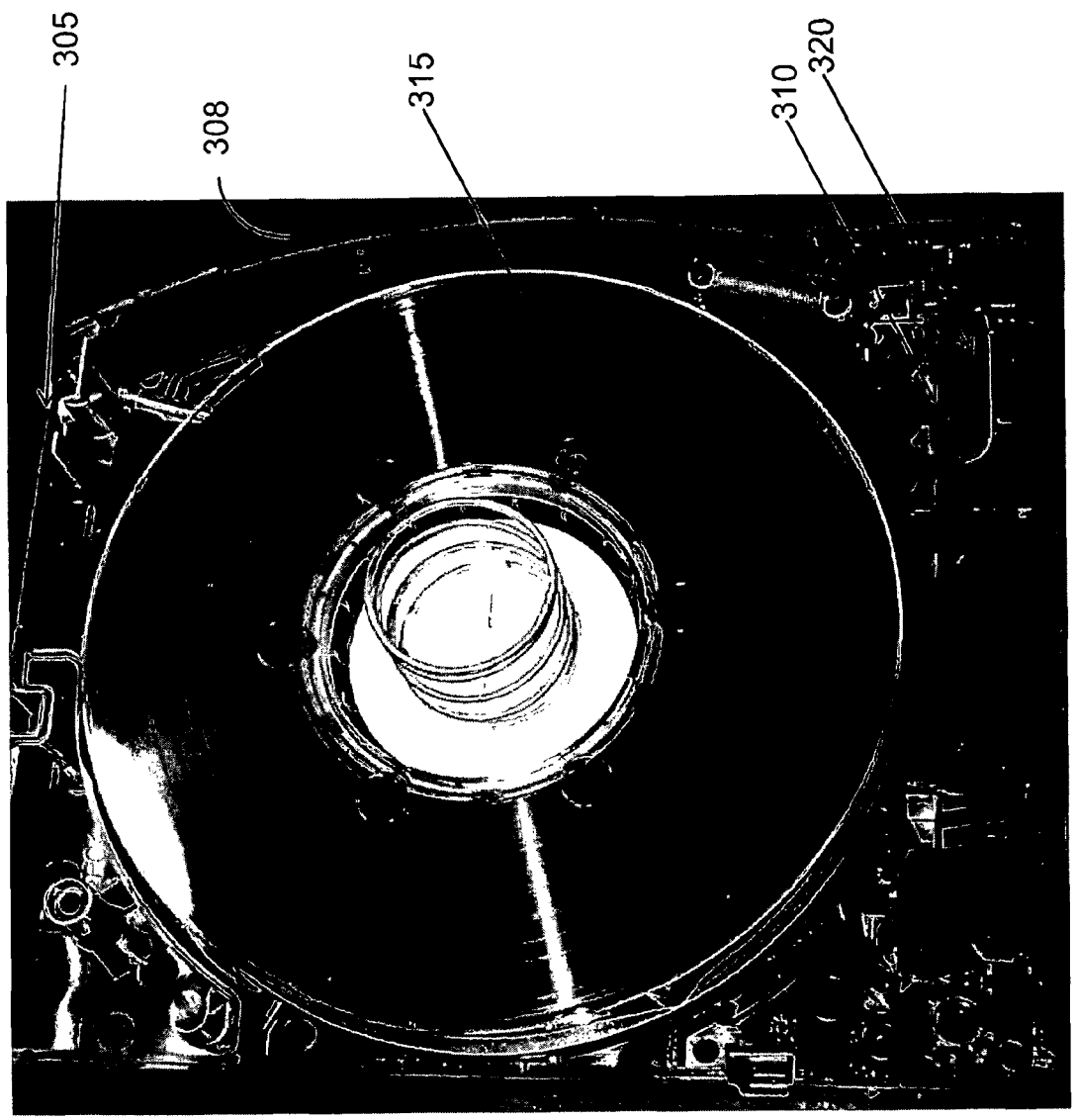
FIG. 3 illustrates one embodiment of a tape cartridge in accordance with one aspect of the invention.

FIG. 3 illustrates another embodiment of a tape cartridge 300 in accordance with another aspect of the invention. Tape cartridge 300 includes housing 305 and door 308 configured to provide access to an interior space of housing 305. Tape cartridge 300 further includes magnetic tape 315 and CM chip 310. CM chip 310 is operably in communication with RFID receiver 320. RFID receiver 320 can be either active or passive.

The disclosures herein provide for preventing a tape drive from reading the data contents of a magnetic tape. Prevention can include preventing the magnetic tape from being removed from the cartridge or by issuing instructions to the tape drive to affect the access of data from the cartridge. In other embodiments, prevention can include a deliberate erasure of all data stored on the magnetic tape. One advantage of simply preventing removal is that no retro-fit of tape drives is required for implementation, as the security measures can be implemented without replacing the tape drives, and instead by simply installing a RFID transmitter and using cartridges equipped as disclosed herein.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A tape cartridge read by a tape drive, comprising:
a housing;
a length of magnetic tape disposed within the housing;
a cartridge memory disposed within the housing; and
at least one RFID reader operably connected to the cartridge memory and configured to write at least one message to the cartridge memory based on a received RFID signal to instruct the tape drive as to whether access to the magnetic tape is authorized, wherein writing the at least one message includes:
writing a first message to the cartridge memory based on the received RFID signal to make the magnetic tape inaccessible and not readable upon the tape cartridge being removed from a secure storage area;
writing a second message to the cartridge memory to reauthorize access to the magnetic tape and make readable in response to replacing the tape cartridge in the secure storage area after writing the first message.

2. The cartridge of claim 1 further comprising at least one audible alarm device configured to sound based on the message.

3. The tape cartridge of claim 1, wherein the first message instructs the tape drive by preventing the tape drive from reading the contents of the magnetic tape.

4. The tape cartridge of claim 1, wherein the first message instructs the tape drive to prevent the removal of the cartridge from the tape drive.

5. The tape cartridge of claim 1, wherein the first message instructs the tape drive to erase the data stored on the magnetic tape.

6. The tape cartridge of claim 1, wherein the first message instructs the tape drive to limit access to only certain portions of the magnetic tape.

7. The tape cartridge of claim 1, wherein the second message instructs the tape drive to re-authorize data access to the magnetic tape after access has been de-authorized.

8. A tape cartridge security system comprising:
a tape drive;
a tape cartridge including
a housing;
a length of magnetic tape disposed within the housing;
a cartridge memory disposed within the housing; and
at least one RFID reader operably connected to the cartridge memory and configured to write at least one message to the cartridge memory based on a received RFID signal to instruct the tape drive as to whether access to the magnetic tape is authorized; and a RFID transmitter configured to transmit a RFID signal to the cartridge memory wherein writing the at least one message includes:
  writing a first message to the cartridge memory based on the received RFID signal to make the magnetic tape inaccessible and not readable upon the tape cartridge being removed from a secure storage area
  writing a second message to the cartridge memory to reauthorize access to the magnetic tape and make readable in response to replacing the tape cartridge in the secure storage area after writing the first message.

9. The system of claim 8, wherein the tape drive includes a wireless communication device configured to transmit messages to the cartridge memory and receive messages from the cartridge memory.

10. The tape cartridge security system of claim 8, wherein the RFID transmitter is disposed in a storage facility, wherein egress by the tape cartridge from the storage facility requires passage by the RFID transmitter.

11. The tape cartridge security system of claim 8, wherein the first message instructs the tape drive by preventing the tape drive from reading the contents of the magnetic tape.

12. The tape cartridge security system of claim 8, wherein the first message instructs the tape drive to prevent the removal of the cartridge from the tape drive.

13. The tape cartridge security system of claim 8, wherein the first message instructs the tape drive to erase the data stored on the magnetic tape.

14. The tape cartridge security system of claim 8, wherein the first message instructs the tape drive to limit access to only certain portions of the magnetic tape.

15. The tape cartridge security system of claim 8, wherein the second message instructs the tape drive to re-authorize data access to the magnetic tape after access has been de-authorized.

16. A method for providing security for a magnetic tape cartridge that is read by a tape drive, the method comprising:
  providing at least one magnetic tape cartridge, the tape cartridge including:
    a housing;
    a length of magnetic tape disposed within the housing;
    a cartridge memory chip disposed within the housing; and
    at least one RFID reader operably connected to the cartridge memory and configured to write at least one message to the cartridge memory based on a received RFID signal;
  providing at least one RFID transmitter configured to transmit a RFID signal to the cartridge memory;
  transmitting the RFID signal from the RFID transmitter to the RFID reader;
  receiving the RFID signal at the RFID reader;
  writing at least one message to the cartridge memory based on the received RFID signal to instruct the tape drive as to whether access to the magnetic tape is authorized, wherein writing the at least one message includes:
    writing a first message to the cartridge memory based on the received RFID signal to make the magnetic tape inaccessible and not readable upon the tape cartridge being removed from a secure storage area;
    writing a second message to the cartridge memory to reauthorize access to the magnetic tape and make readable in response to replacing the tape cartridge in the secure storage area after writing the first message.

17. The method of claim 16, wherein the second message instructs the tape drive to allow access to the magnetic tape based on the at least one RFID reader receiving a second RFID signal.

18. The method of claim 16, wherein the first message instructs the tape drive by preventing the tape drive from reading the contents of the magnetic tape.

19. The method of claim 16, wherein the first message instructs the tape drive to prevent the removal of the cartridge from the tape drive.

20. The method of claim 16, wherein the first message instructs the tape drive to erase the data stored on the magnetic tape.

* * * * *